(12) United States Patent
Bajramovic (10) Patent No.: US 7,057,604 B2
(45) Date of Patent: Jun. 6, 2006

(54) COMPUTER MOUSE ON A GLOVE

(75) Inventor: Mark B. Bajramovic, Ottawa (CA)

(73) Assignee: Mikamed Health Technologies Inc., Ontario (CA)

( * ) Notice: Subject to any disclaimer, the term of this patent is extended or adjusted under 35 U.S.C. 154(b) by 0 days.

(21) Appl. No.: 10/382,849

(22) Filed: Mar. 7, 2003

(65) Prior Publication Data

US 2003/0137489 A1     Jul. 24, 2003

Related U.S. Application Data

(63) Continuation of application No. 09/899,277, filed on Jul. 6, 2001, now abandoned.

(51) Int. Cl.
*G09G 5/08*     (2006.01)
(52) U.S. Cl. ................. 345/163; 345/158; 345/167
(58) Field of Classification Search ........ 345/156–158, 345/163, 166, 167, 169, 161
See application file for complete search history.

(56) References Cited

U.S. PATENT DOCUMENTS

| | | | |
|---|---|---|---|
| 4,881,276 A | | 11/1989 | Swan |
| 5,444,462 A | * | 8/1995 | Wambach ................. 345/158 |
| 5,517,211 A | | 5/1996 | Kwang-Chien |
| 5,581,484 A | | 12/1996 | Prince |
| 5,706,026 A | * | 1/1998 | Kent et al. ................. 345/156 |
| 5,790,980 A | | 8/1998 | Yewer, Jr. |
| 5,914,704 A | | 6/1999 | Yamada et al. |
| 6,097,369 A | | 8/2000 | Wambach |
| 6,154,199 A | * | 11/2000 | Butler ..................... 345/167 |

| | | |
|---|---|---|
| 2002/0067342 A1 | 6/2002 | Proper |
| 2002/0175894 A1 | 11/2002 | Grillo |

FOREIGN PATENT DOCUMENTS

| | | |
|---|---|---|
| EP | 0 646 888 A | 4/1995 |
| EP | 0 696 014 A | 2/1996 |
| GB | 1 480 243 | 5/1974 |
| WO | WO 92 09983 A | 6/1992 |
| WO | WO 02/27456 A1 | 4/2002 |

OTHER PUBLICATIONS

Atlas of Human Anatomy, Second Edition 1997 by Frank H. Netter.

* cited by examiner

*Primary Examiner*—Regina Liang
(74) *Attorney, Agent, or Firm*—Miles & Stockbridge P.C.; Edward J. Kondracki (57) ABSTRACT

A computer input device on a glove includes fittings for a user's fingers and adjustable straps for fastening to a user's wrist. A tracking device for controlling cursor movement on a video display is affixed to the glove for positioning next to the end of one of the user's fingers. Pressure plates for controlling the various right and left mouse "clicking" functions are affixed to the glove for positioning next to the ends of the other of the user's fingers. Scrolling/paging buttons are located on the side of the fitting fitted to the index finger for pressing by the thumb. A transmitter is affixed to the glove for receiving signals from the tracking device, the pressure plates and the scrolling/paging buttons, and transmitting those signals to a computer for controlling cursor movement in the x-y plane on a video display and for controlling the various mouse "clicking" controls, which implement the "select" function, the "drag" function, the "scroll" function, the "page" function, and so forth.

40 Claims, 8 Drawing Sheets

COMPUTER MOUSE ON A GLOVE

CROSS REFERENCE TO RELATED APPLICATION

This application is a continuation of application Ser. No. 09/899,277, filed Jul. 6, 2001 now abandoned.

BACKGROUND OF THE INVENTION

1. Field of the Invention

This invention relates generally to the field of peripheral computer input devices, and more particularly to a computer mouse of the type which controls cursor movement on a video display and the various "click" controls, which implement the "select" function, the "drag" function, the "scroll" function, the "page" function, and so forth.

2. Description of the Related Art

A mouse is used as a computer input device to control the location of a cursor on a video display connected to the computer. Typically, cursor location is controlled by movement of the mouse across a surface. The mouse includes a tracking device for measuring the movement of the mouse across the surface. This movement is relayed to the computer where it is translated into a corresponding movement of the cursor on the display. Several different tracking devices are known and used.

In addition, there are typically two or three buttons on the mouse for controlling switching functions. These switching functions are typically used to activate a function or command identified by the cursor location, or they can be set to control certain software features, such as highlighting in a word processor. Other mouse buttons may also be included and used to provide control for other software features such as scrolling or paging.

Many attempts have been made to design an easy to use computer mouse, which is ergonomically synchronized with the human form. Those attempts have generally been unsuccessful because the human hand comes in many shapes and sizes. Therefore, one size of computer mouse certainly does not fit all hand sizes. The result has been increasing incidents of carpel tunnel syndrome amongst mouse users as they struggle to conform their hands to the currently available designs.

In addition to hand and arm strain, one major disadvantage of the conventional mouse design is that users often must spend valuable time searching their desktops to locate the mouse before using it. This disrupts the creative process and hinders both user performance and productivity.

Some attempts have been made to solve these problems by locating a tracking device, such as a track ball or a sensor pad, right on the computer keyboard, but some find these devices awkward to use and difficult to master. Moreover, such devices still require the user to remove his or her eyes from the display to find the exact location of the tracking device. This process can interrupt work flow and reduce productivity.

One solution to these problems is to integrate the functions of a computer mouse with the individual user's hand. A recent attempt to do this is described in U.S. Pat. Nos. 5,444,462, and 6,097,369 issued to Wambach on Aug. 22, 1995 and Aug. 1, 2000, respectively. Wambach describes a glove to be worn on a user's hand wherein the glove includes micro-switches mounted next to a joint of the index finger and on opposite sides of the wrist. The switches translate up and down movement of the index finger and side to side movement of the wrist into vertical and horizontal movements, respectively, of a cursor on a computer display. Buttons are provided on the other fingers to provide mouse clicking functions and to turn the glove on and off. These buttons are activated by the thumb. Although the device described by Wambach does not require a surface over which a tracking device must be moved, it does require a great deal of skill and considerable practice for the user to be able to control a cursor on a video display with any degree of accuracy. Further, the device must be manually activated prior to use and manually deactivated after use so that hand movements are not inadvertently translated into cursor movements on the screen while the user is typing.

Another recent attempt at a solution is described in U.S. Pat. No. 6,154,199 issued to Butler on Nov. 28, 2000. Butler describes a hand positioned mouse which includes a glove having a tracking ball supported in a housing attached to the side of the index finger so that the tracking ball can be operated by the thumb. Mouse buttons are positioned on the palm of the glove for activating mouse "click" functions. Transmission means are contemplated for sending signals corresponding to tracking ball movement to the computer. However, Butler makes no provision for using a tracking device that includes an optical sensor or for using a tracking device in contact with a surface. Moreover, Butler's tracking device and mouse "click" buttons do not automatically turn "off" when not in use to permit typing, and do not automatically turn "on" again when required for moving the cursor and performing mouse "clicking" functions. Butler's device also does not include "scrolling" or "paging" functions. Further, Butler's design restricts movement of the hand during operation to small movements of the thumb and fingers required to activate the tracking device the mouse click buttons. This results in reduced blood flow to the hand when compared to other mouse designs which require whole arm movements.

From the above, it is clear that there is a need for a more ergonomically efficient mouse design to reduce or prevent injury and to improve productivity and performance.

BRIEF SUMMARY OF THE INVENTION

Briefly summarized, the main object of the present invention is to overcome the above shortcomings by providing a computer mouse on a glove to be worn by a user, which includes a tracking device for controlling cursor movement on a video display and one or more switches for controlling mouse "click" functions.

A further object of a preferred embodiment of the present invention is to provide a computer mouse on a glove to be worn by a user, which will permit the user to type on a keyboard with all fingers while wearing the glove.

Another object of a preferred embodiment of the present invention is to provide a computer mouse on a glove to be worn by a user, which will automatically activate when the tracking device is in contact with a surface and the user desires to move the cursor or use the mouse "click" functions, and will automatically deactivate when the user wishes to resume typing.

Yet another object of a preferred embodiment of the present invention is to provide a computer mouse on a glove, which is adjustable to the size of a user's hand and includes padding to minimize user strain and maximize performance.

Another object of a preferred embodiment of the present invention is to provide a computer mouse on a glove, which includes buttons to permit a user to control up and down scrolling and paging functions without having to remove the user's hands from the computer keyboard.

Several advantageous features of the preferred embodiments of the present invention are as follows:
  (a) the computer mouse on a glove of the present invention is the ultimate in ergonomic design since it conforms directly to the user's hand and does not require the user to conform his or her hand to the mouse. This reduces strain on the user's hand, prevents injury (such as Carpel Tunnel Syndrome and other related repetitive stress injuries), and increases productivity;
  (b) the computer mouse on a glove of the present invention will permit a user to type on a keyboard with all fingers while wearing the glove;
  (c) the computer mouse on a glove of the present invention will automatically activate when the tracking device is placed in contact with a surface allowing the user to move the cursor or use the mouse "click" functions and will automatically deactivate when a user desires to resume typing.
  (d) the computer mouse on a glove of the present invention can be manufactured in accordance with different hand sizes, and the use of a stretch fabric and an adjustable wrist strap permits easy accommodation of a wide range of hand and finger sizes;
  (e) the computer mouse on a glove of the present invention includes padding in the palm area of the glove, which will help to minimize user strain and maximize performance;
  (f) the computer mouse on a glove of the present invention will eliminate the need for a user to search for the computer mouse on a desktop before use; and
  (g) the computer mouse on a glove of the present invention will permit a user to control up and down scrolling and paging functions without having to remove the user's hands from the computer keyboard.

Further objects and advantages of the present invention will be apparent from the following description and the appended drawings, wherein preferred embodiments of the invention are clearly described and shown.

BRIEF DESCRIPTION OF THE DRAWINGS

The present invention will be further understood from the following description with reference to the drawings in which.

REFERENCE NUMERALS SHOWN IN DRAWINGS 10 computer input device
12 user's hand
14 glove-like apparel
16 adjustable straps
18 index finger
20 middle finger
22 ring finger
24 tracking device
26 pressure plate on middle finger
27 pressure plate on ring finger
30 transmitter
31 charging port
32 scroll/page switch button
33 scroll/page up/down button
34 scroll/page up/down button
36 high friction fabric
40 base plate
41 low battery indicator
42 optical sensor
43 bright light emitting diode
44 oval shaped opening in base plate
46 wires
50 surface
60 receiver
62 cable

DETAILED DESCRIPTION OF THE PREFERRED EMBODIMENTS OF THE INVENTION

Figure 1:
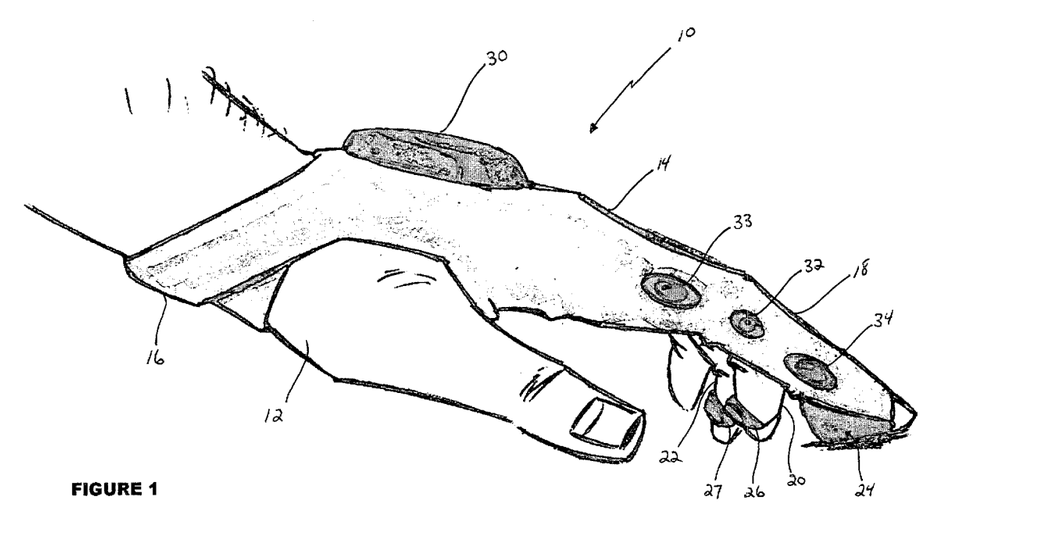
FIG. 1 is a perspective side view of a preferred embodiment of the present invention worn on a user's left hand.

Referring to the drawings, FIG. 1 shows one preferred embodiment of the computer input device 10 of the present invention fitted on a user's left hand 12. The computer input device 10 includes a glove-like apparel 14 secured to the wrist with adjustable straps 16. Glove-like apparel 14 includes fittings for an index finger or digit 18, a middle finger 20 and a ring finger 22. A tracking device 24 is shown attached to the fitting for index finger 18 of glove 14 and pressure plates 26, 27 are shown attached to the fittings for middle finger 20 and ring finger 22, respectively. A transmitter 30 is attached to the top of glove 14 for positioning on the back of hand 12, and scroll/page buttons 32, 33, 34 are shown attached to the side of the fitting for index finger 18 where they can be easily accessed by the thumb of the user's hand 12.

It will be appreciated by the reader that the particular configuration of input device 10 shown in FIGS. 1 through 7 is for illustrative purposes only. Depending on user preference, tracking device 24 and pressure plates 26, 27 may be interchangeably attached to the fittings for either of index finger 18, middle finger 20, ring finger 22 or thumb (see FIGS. 11 to 13). For example, some users may prefer to attach tracking device 24 to the fitting for the more dominant middle finger 20 and attach pressure plates 26, 27 to the fittings for index finger 18 and ring finger 22, respectively.

Figure 11:
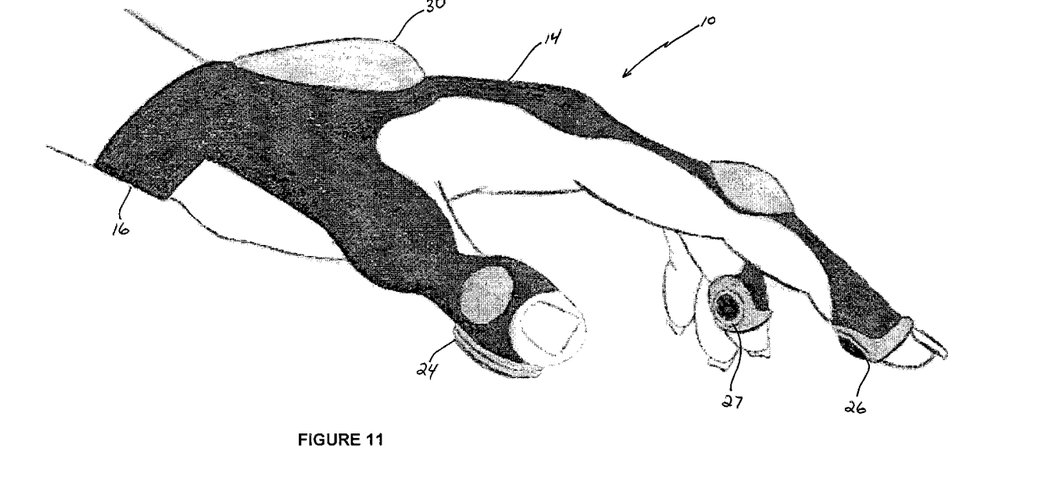
FIG. 11 is a perspective side view of another preferred embodiment of the present invention worn on the user's left hand, showing the tracking device attached to the fitting for the thumb finger or digit.
Figure 12:
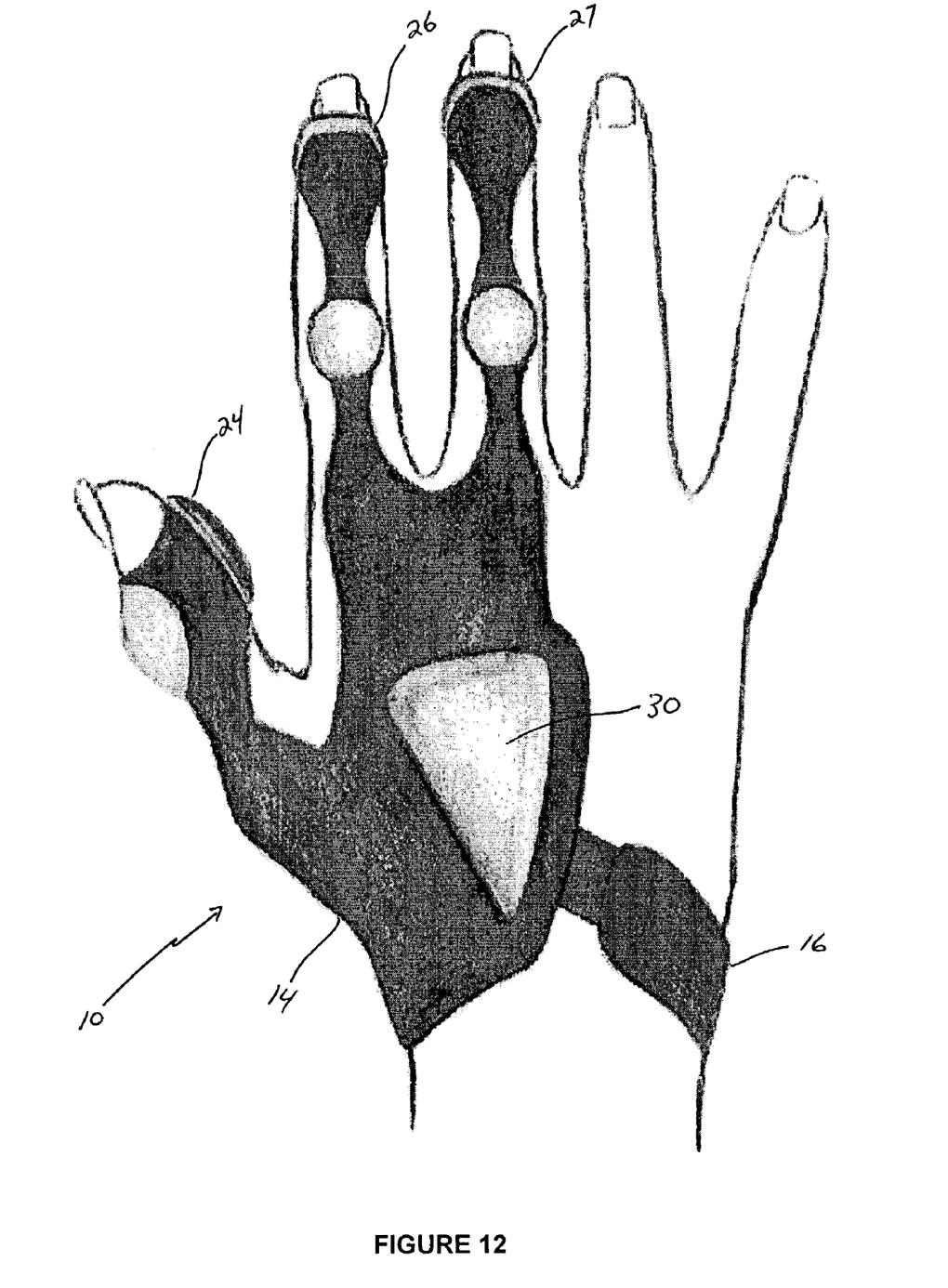
FIG. 12 is a perspective top view of the embodiment of the present invention shown in FIG. 11, worn on the users right hand.
Figure 13:
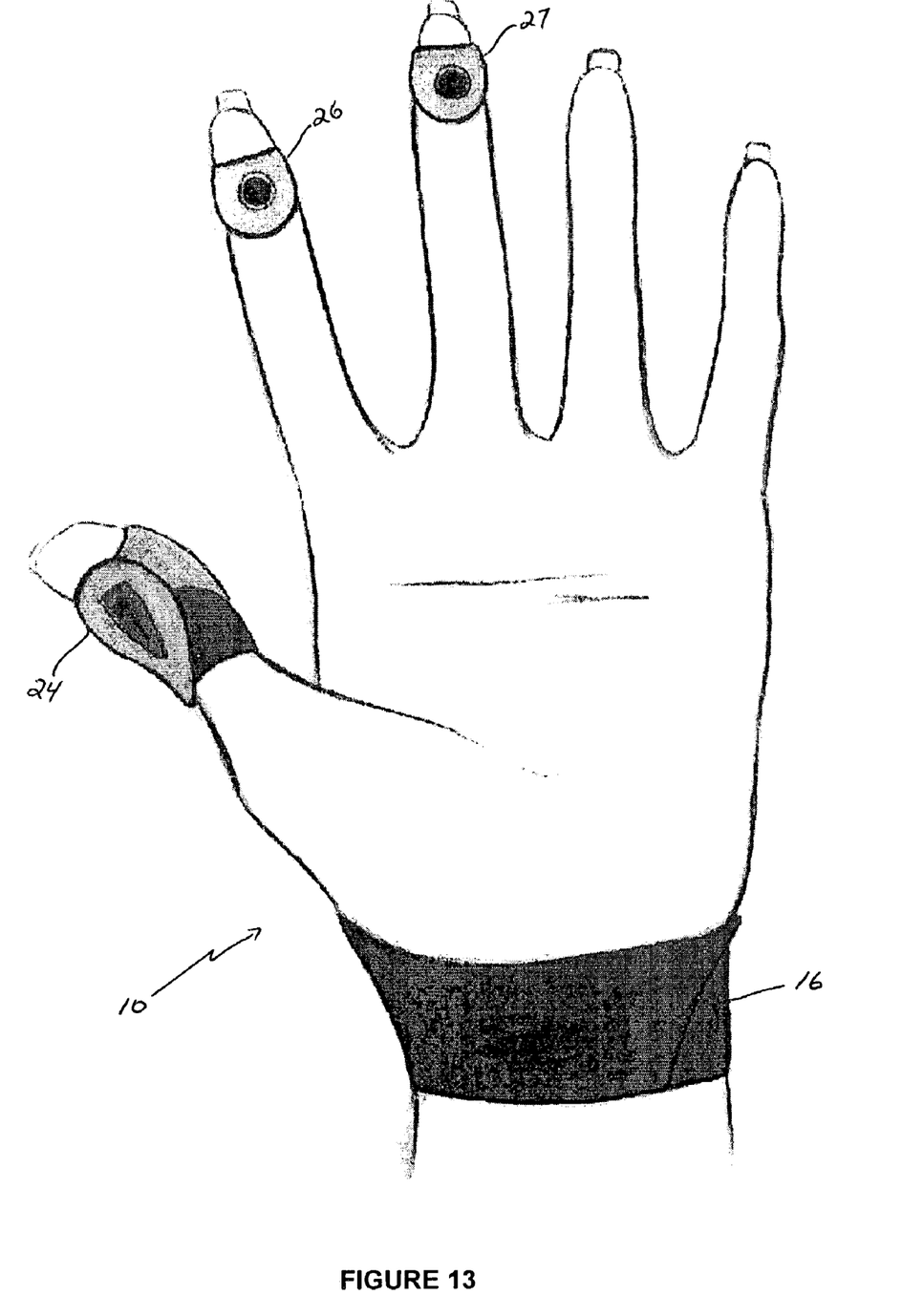
FIG. 13 is a perspective bottom view of the embodiment of the present invention shown in FIG. 11 and worn on the user's left hand.

Any reference in this application to fingers and/or digits, shall include the thumb. Accordingly, as shown in FIGS. 11, 12 and 13, glove 14 may include a fitting for a thumb, and tracking device 24 may be attached to the thumb fitting, while pressure plates 26, 27 are attached to the other finger or digit fittings.

Glove 14 can be made in various sizes, such as small, medium and large, to fit various sized hands, either left or right. Glove 14 is composed of a lightweight durable fabric having the ability to conform to the user's hand. Any suitable fabric can be used so long as it is lightweight, durable and will stretch to accommodate various sized hands. Preferably, the exterior of glove 14 will be constructed to include areas of low-friction fabric located to facilitate movement of glove 14 over surface 50. Examples of suitable fabrics include composite fabrics such as:

1) 79% nylon and 21% Lycra™ spandex;
2) 78% polyamide and 22% spandex; or
3) 5% cotton, 36% polyester, and 59% Lycra™.

The overall thickness of the fabric will preferably be between 0.8 mm and 1.4 mm to maximize both durability and flexibility while minimizing weight. Straps 16 secure glove 14 to the user's wrist and can be any suitable adjustable fastening device such as Velcro™ straps, hooks and eyelets, or a button/clasp mechanism. All of these features permit the computer input device 10 of the present invention to be comfortably fit to an almost limitless range of hand sizes.

Figure 6:
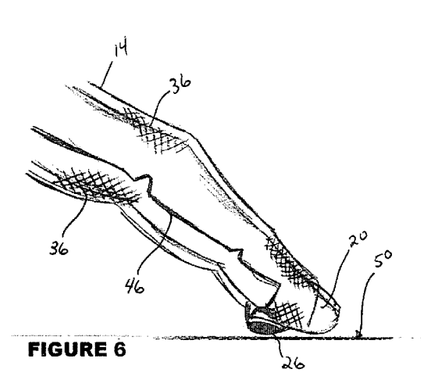
FIG. 6 is a close-up, partially sectional perspective view of the device shown in FIG. 1, showing a pressure plate attached to the fitting for the middle finger.
Figure 7:
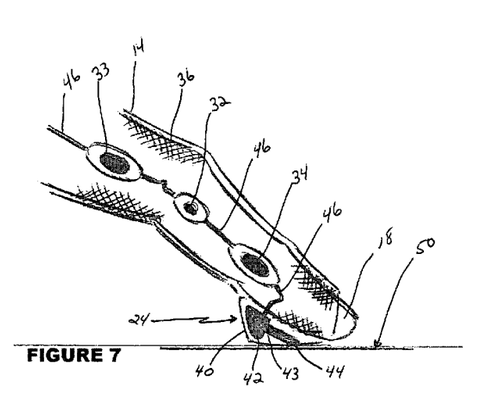
FIG. 7 is a close-up, partially sectional perspective view of the device shown in FIG. 1, showing a tracking device attached to the fitting for the index finger.

Referring now to FIGS. 6 and 7, which are close-up, partially sectional views of the fittings for the ring finger 20 and index finger 18, respectively. The interior surface of the fittings for the fingers can include areas of high-friction fabric 36, such as a rubber polymer, designed to create a mild friction between glove 14 and the user's hand. The areas of high-friction fabric 36 prevent glove 14 from shifting on the user's hand during prolonged use and permit more accurate positioning of tracking device 24, pressure plates 26, 27, scroll/page buttons 32, 33, 34, and transmitter 30 with respect to the user's hand.

Figure 2:
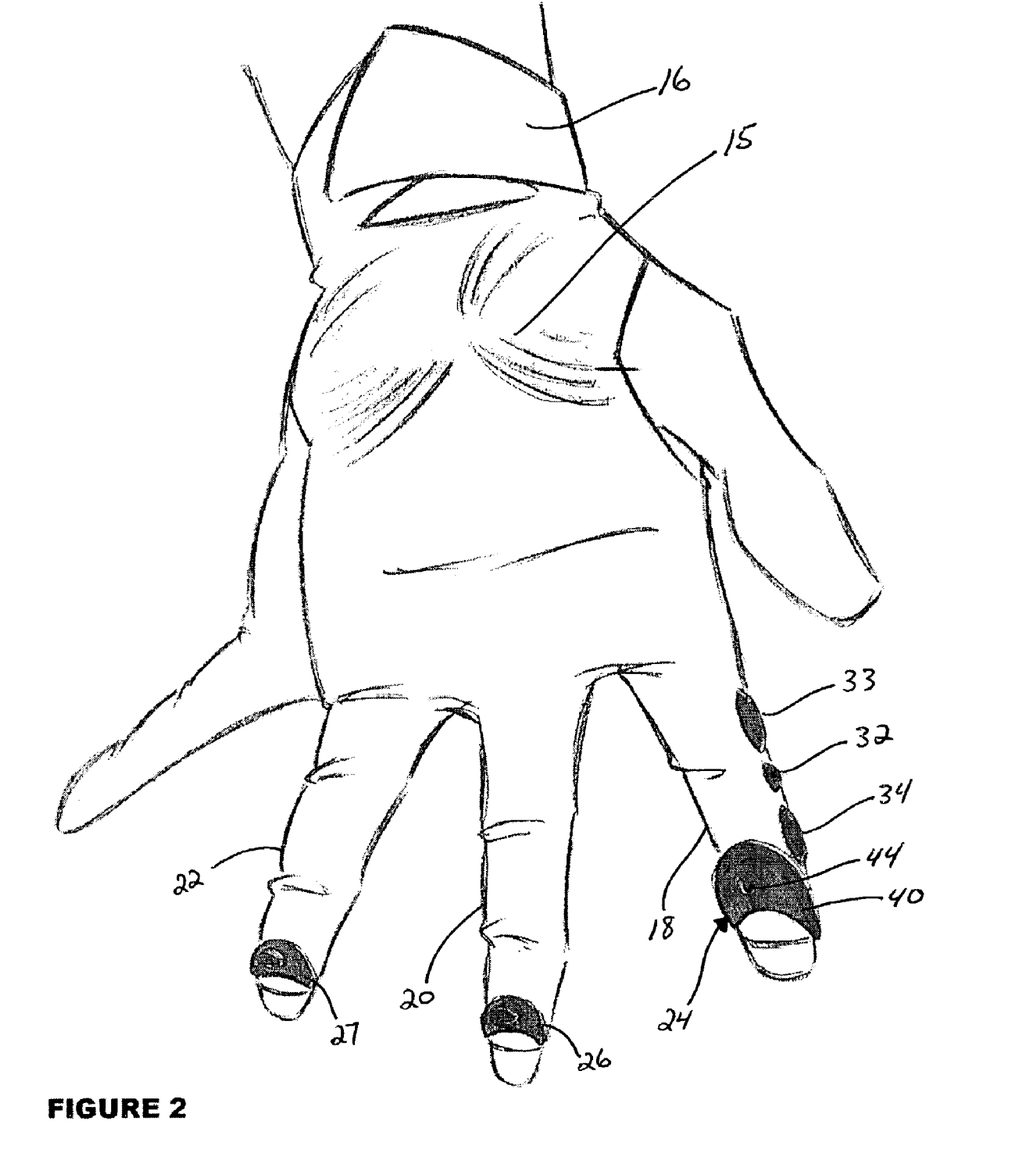
FIG. 2 is a perspective view of the device shown in FIG. 1, looking towards the palm.

Referring to FIG. 2, glove 14 may include a palm area 15 that preferably is padded to assist in ergonomically positioning the user's hand during operation of the present invention so as to minimize strain and maximize performance and comfort. The padding located in palm 15 may be composed of any suitable material including elastic polymer gel, sponge polymer, or double stitched glove fabric. As shown in FIG. 13, palm area 15 may be omitted.

FIG. 7 is a close up, partially sectional view of the fitting for index finger 18 fitted on a user's hand, showing, in this case, tracking device 24 attached near the end. As noted above, tracking device 24 may also be attached to the fittings for either middle finger 20 or ring finger 22, or the thumb (see FIGS. 11 to 13), depending on user preference. In the illustrated case, tracking device 24 is an optical tracking device which includes a base plate 40 for housing an optical sensor 42. Base plate 40 allows for smooth consistent motion of tracking device 24 over a surface 50 and ensures that a consistent distance and an even surface contact is maintained between optical sensor 42 and surface 50. Optical sensor 42 can be any suitable optical sensor, which is capable of accurately tracking movement of tracking device 24 over surface 50 and generating an electrical movement signal corresponding thereto. The movement signal generated by optical sensor 42 is sent along wires 46, which are laid into the fabric of glove 14, to transmitter 30 for relaying to a computer for controlling a cursor on a video display. Those skilled in the art will be well aware of the various types of optical sensors that could be used in the present invention. Traditional optical sensors used for tracking movement have required use of a special mouse pad to enable the sensor to accurately detect and measure movement. Newly designed optical sensors no longer require a special mouse pad and can function on virtually any surface, including a desktop or a user's pants. In this latter design, a bright light emitting diode 43 illuminates an area of surface 50 through a small angular oval shaped opening 44 in the bottom of base plate 40 (see FIGS. 2 and 7) immediately below a tiny camera (not shown) which detects reflections off the surface. The steep angle of lighting maximizes detection of surface irregularities permitting the camera to detect and measure movement across the surface. One advantage of using an optical tracking device is that, unlike conventional roller-ball tracking devices, an optical device does not collect dust and does not require any significant cleaning.

In the alternative, the reader will appreciate that a micro roller-ball could be used in place of optical sensor 42 for measuring movement of tracking device 24 over surface 50 and for generating an electrical movement signal corresponding to that movement. A micro roller-ball would operate in a manner similar to the roller-ball systems used in the traditional desktop computer mouse. Rotation of the roller-ball, resulting from contact with surface 50, is picked up by sensors within the tracking device, which produce an electrical movement signal or pulse corresponding to the rotation.

Figures 3, 4, 5:
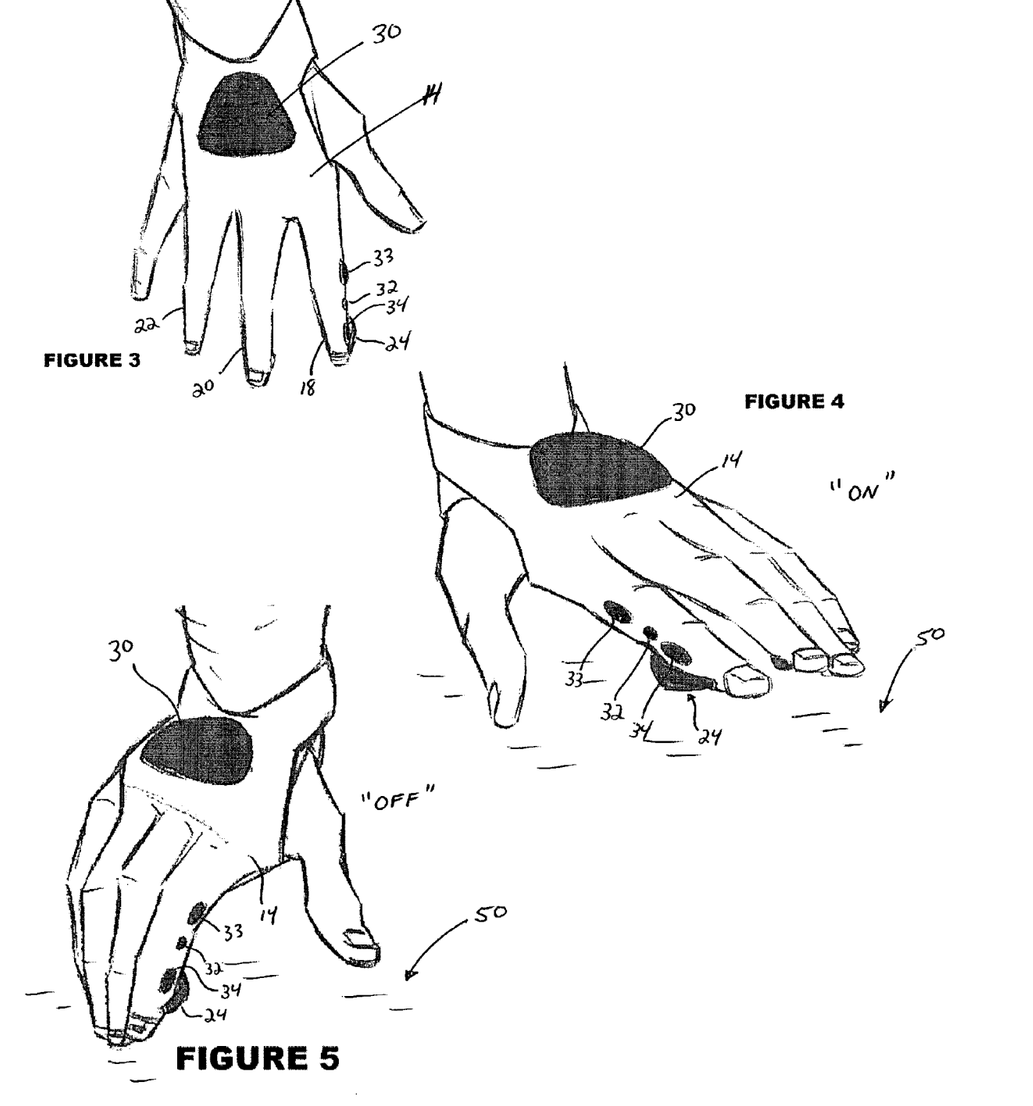
FIG. 3 is a perspective view of the device shown in FIG. 1, worn on a user's right hand, looking down at the back of the hand.
FIG. 4 is a perspective view of the device shown in FIG. 1, worn on a user's left hand, showing the tracking device in the "on" position in contact with a surface.
FIG. 5 is a perspective view of the device shown in FIG. 1, worn on a user's right hand, showing the tracking device in the "off" position not in contact with a surface.

Tracking device 24 is preferably designed so that it automatically turns "on" when placed in contact with surface 50 and automatically turns "off" when contact with surface 50 is interrupted. This can be accomplished using a small micro-switch (not shown) located on the bottom of base plate 40 or internally, or by optical sensor 42, which can be configured to turn tracking device 24 on/off when moved a certain predetermined distance from surface 50. This is illustrated in FIGS. 4 and 5. FIG. 4 shows tracking device 24 in the "on" position in contact with surface 50 and FIG. 5 shows tracking device 24 in the "off"position wherein contact with surface 50 has been interrupted. When tracking device 24 is in the "on" position, pressure plates 26, 27 are also in the "on" position. When tracking device 24 is raised from surface 50 and is in the "off" position, pressure plates 26, 27 are also turned "off". This is advantageous since it permits the user to type on a keyboard with all fingers and perform other activities without fear of engaging the device or sending unwanted input to the computer. When the user needs to move a cursor on a video screen or perform mouse "click" functions, no additional movements are required to turn on the device. All the user has to do is place tracking device 24 in contact with a surface and the device will automatically turn "on". Similarly, these functions will automatically turn "off" when contact with the surface and tracking device 24 is broken.

FIG. 6 is a close up, partially sectional view of the fitting for middle finger 20 fitted on a user's hand, showing, in this case, pressure plate 26 attached near the end. FIG. 6 could equally represent the same view of the fitting for ring finger 22 or index finger 18, or be illustrative of pressure plate 27. Pressure plates 26, 27 each include a micro-switch (not shown) that is activated by a predetermined amount of pressure contact with surface 50. Pressing down on pressure plates 26, 27 with a predetermined amount of force will generate a switching signal which is sent along wires 46 to transmitter 30. Switching signals generated by pressure plates 26, 27 correspond to traditional right and left mouse "clicking" functions that are typically used to activate a function or command identified by the cursor location, on a computer video display, or they can be set to control certain software features, such as highlighting in a word processor. As described above, pressure plates 26, 27 are activated when tracking device 24 is placed in contact with surface 50 and deactivated when contact between surface 50 and tracking device 24 is broken. Those skilled in the art will appreciate that both pressure plates 26, 27 are not required and that the computer input device 10 of the present invention could function with only one such pressure plate, however, two are preferable.

It can be seen from FIGS. 1–7 and 11–13, that tracking device 24 and pressure plates 26, 27 are located sufficiently back from the tips of the fingers, and the finger tips are sufficiently exposed to permit typing on a keyboard with all of the user's fingers while glove 14 is fitted on the hand of a user. As shown, the tips of the fittings for the fingers may be removed to expose the user's finger tips, thereby providing the user with added control and sensitivity when performing delicate tasks.

FIGS. 1, 2, 3, 4, 5 and 7 show scroll/page buttons 32, 33, 34 located on the outside of the fitting for index finger 18 of glove 14 where they can be easy activated by the thumb of a user when glove 14 is fitted on a user's hand. Scroll/page buttons 32, 33, 34 each include a micro-switch that can be pressed to generate scroll/page signals, which are sent to transmitter 30 along wires 46. Typically, scroll/page signals generated by scroll/page buttons 32, 33, 34 are used for controlling up and down scrolling and paging functions available in many software applications. Scrolling is defined as the action of moving a computer display either forward or backward through data one or many lines at a time. Paging is defined as either moving a computer display forward or backward through data one page at a time, or, in an Internet browser application, paging forward or backward through web pages.

In a preferred embodiment of the present invention, central scroll/page button 32 is used as a switch to alternate the function of scroll/page buttons 32, 34 between scrolling and paging. Scroll/page buttons 33, 34 control up and down scrolling and paging functions, respectively, depending on software and the position of scroll/page switch 32. One advantage of scroll/page buttons 32, 33, 34 in the present invention is that a user does not have to remove his/her hands from the keyboard to activate and control the scrolling or paging features, nor does the user have to make contact with any surface to engage the scrolling features. Depending on user preference, the functions of scroll/page buttons 32, 33, 34 are completely interchangable so that either button may act as the switch button while the other two buttons function as scroll/page up/down buttons.

Figure 10:
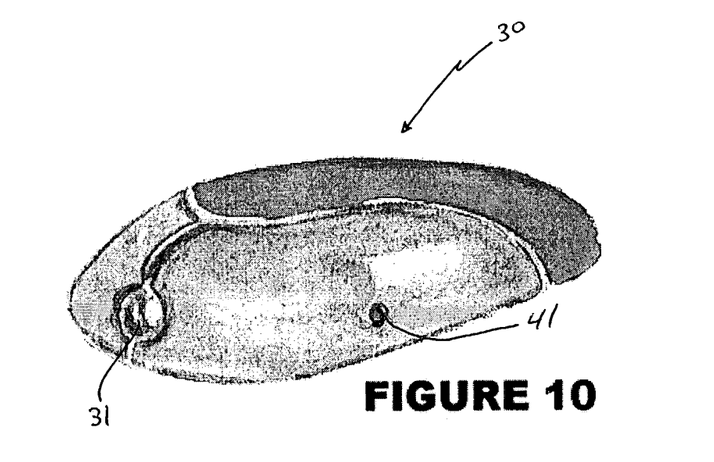
FIG. 10 is a close-up perspective view of one possible embodiment of a transmitter of the present invention as shown in FIG. 1.

FIGS. 1, 3, 4, 5, 11 and 12 show transmitter 30, which is typically affixed to the back side of glove 14. FIG. 10 shows an enlarged view of transmitter 30 disconnected from glove 14. Transmitter 30 is preferably either a radio frequency (RF) transmitter, or an infrared (IR) transmitter, but may be any other suitable device capable of wirelessly transmitting signals received along wires 46 from tracking device 24, pressure plates 26, 27 and scroll/page buttons 32, 33, 34, between glove 14 and a computer. In the alternative, transmitter 30 may communicate to a computer via a connector cord (not shown), but this method of transmitting signals would reduce the mobility and functionality of the present invention and is not recommended by the applicant. Transmitter 30 is typically powered by lightweight, on-board, rechargeable batteries, such as nickel-cadmium batteries, which have a long life and can be easily re-charged through charging port 31. Glove 14 can be used while the batteries are being charged, but the power cord that would be used to connect to charging port 31 would be somewhat obtrusive. Transmitter 30 also includes a low battery indicator light 41. To save power, transmitter 30 can be designed to automatically turn off after a certain period of non-use. Activating tracking device 24, or pressing any of scroll/page buttons 32, 33, 34 would automatically re-engage transmitter 30.

Figures 8, 9:
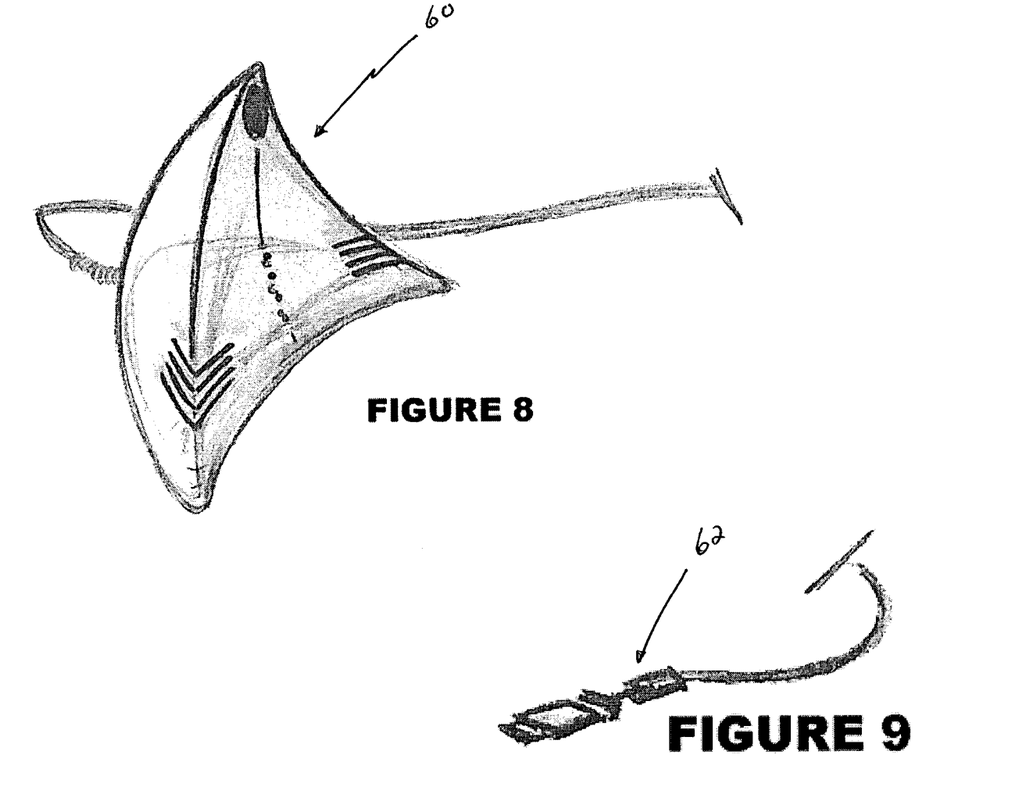
FIG. 8 is a perspective view of one possible embodiment of a receiver of the present invention.
FIG. 9 is a perspective view of one possible embodiment of a USB port connector cable of the present invention.

FIG. 8 shows a wireless receiver 60 for receiving wireless signals from transmitter 30. As indicated above, receiver 60 may be either an RF receiver or an IR receiver, depending on the configuration of transmitter 30, or may be any suitable receiver capable of receiving wireless signals from transmitter 30 for communication between glove 14 and a computer. Receiver 60 is connected to a computer through an input port such as a USB port, using, for example, cable 62 shown in FIG. 9. Movement signals, switching signals and scrolling/paging signals generated by computer input device 10 are relayed by transmitter 30 to receiver 60 and further through cable 62 to the computer for controlling the various mouse functions described, such as cursor movement, "clicking" functions, and scrolling/paging functions. Depending on the mode of wireless communication utilized, receiver 60 may need to be placed on the desk top within the line of site of transmitter 30 (if IR transmission is used) or it may be possible to place it out of the way, near the back of the computer (if RF transmission is used). In the alternative, if the transmission of signals between computer input device 10 and the computer is accomplished over a connector cable, receiver 60 would not be required and transmitter 30 could be connected directly to the computer with a connector cable.

In operation, a user fits glove 14 of computer input device 10 on either the left or right hand, depending on the configuration, and secures it to the wrist with straps 16. Tracking device 24 and pressure plates 26, 27 are preferably positioned just behind the finger tips. User preference will determine on which finger fittings each of the pressure plates 26, 27 and tracking device 24 are attached. Scroll/page buttons 32, 33, 34 are preferably located on the side of the fitting for index finger 18, next to the thumb for easy operation. Transmitter 30 is located on the back of the hand and receiver 60 is plugged into a computer, unless a connector cable is used, in which case, a connector cable directly connects transmitter 30 to the computer. At this point, the device 10 is "off" and the user is able to type on a keyboard with all fingers and perform normal functions without activating any computer mouse functions. To control a cursor on the computer screen, a user places tracking device 24 in contact with surfaces 50 (see FIGS. 4 and 7). This activates sensor 42 and pressure plates 26, 27. Any movement of tracking device 24 over surface 50 generates movement signals which are transmitted by transmitter 30 to receiver 60 and then through cable 62 to the computer to effect corresponding movement of a cursor on the computer screen. Mouse "clicking" functions are controlled by pressing down on pressure plates 26, 27 to generate switching signals, which are also transmitted to the computer. Once tracking device 24 is raised from surface 50 (see FIG. 5) sensor 42 and pressure plates 26, 27 are deactivated and typing can resume normally. To control scrolling or paging functions, the user merely presses scroll/page up/down buttons 33, 34 to scroll or page backwards and forwards through screen data. If transmitter 30 had disengaged following a period of non-use, touching scroll/page buttons 32, 33, 34 would re-engage transmitter 30. Scroll/page switch button 32 is used to alternate between the scrolling and paging functions. In an Internet browser application the page function can be used to page forward or backward through web pages. A main advantage of the present invention is that scrolling/paging features can be controlled without moving the user's hands from the keyboard.

The present computer input device 10 is supported by software, which must be installed on the computer to which device 10 is attached. The software will permit full customization of all features of the present invention. For example, sensitivity of cursor movement could be adjusted in the software from fine to coarse depending on user preference and needs. Mouse "right click" and "left click" functions, controlled by pressure plates 26, 27, could be interchanged depending upon user preference. In addition, the functions of scroll/page buttons 32, 33, 34 could be selected according to a user's needs or preference. Preferred settings selected by different users could be saved to permit easy interchange of the present invention between users.

The above is a detailed description of particular preferred embodiments of the invention. Those with skill in the art should, in light of the present disclosure, appreciate that obvious modifications of the embodiments disclosed herein can be made without departing from the spirit and scope of the invention. All of the embodiments disclosed and claimed herein can be made and executed without undue experimentation in light of the present disclosure. The full scope of the invention is set out in the claims that follow and their equivalents. Accordingly, the claims and specification should not be construed to unduly narrow the full scope of protection to which the present invention is entitled.

What is claimed is:

1. A computer input device, comprising:
   a glove-like apparel having a fitting for at least one digit;
   a tracking device attached to said at least one digit fitting to generate movement signals in accordance with movement of said tracking device across a surface;
   a first pressure plate attached to said glove-like apparel to provide first switching signals;
   a transmitter attached to said glove-like apparel for transmitting said movement signals from said tracking device and said first switching signals; and
   an on/off switch for automatically disengaging said tracking device and said first pressure plate whenever said tracking device is not in contact with said surface and for automatically engaging said tracking device and said first pressure plate whenever said tracking device is in contact with said surface,
   wherein said transmitted movement signals from said tracking device being adapted to control movement of a cursor in a video display of a computer and said transmitted first switching signals being adapted to initiate clicking functions.

2. The computer input device of claim 1, wherein said glove-like apparel has a second digit fitting and wherein said first pressure plate is attached to said second digit fitting.

3. The computer input device of claim 2, wherein said glove-like apparel includes a third digit fitting having a second pressure plate attached thereto to provide second switching signals, and wherein said transmitter also transmits said second switching signals from said second pressure plate to said computer for controlling mouse clicking functions.

4. The computer input device of claim 2, wherein said tracking device and said first pressure plate are operably positioned so as to leave the tips of said digits exposed for typing.

5. The computer input device of claim 1, further including scroll/page buttons on said glove-like apparel for generating scroll/page signals, wherein said transmitter also transmits said scroll/page signals to said computer for controlling up and down scrolling and paging functions.

6. The computer input device of claim 5, wherein said scroll/page buttons comprise:
   a scroll/page switch button for switching between said scrolling and paging functions;
   a scroll/page up button; and
   a scroll/page down button.

7. The computer input device of claim 1, wherein said tracking device is an optical tracking device.

8. The computer input device of claim 1, wherein said tracking device and said first pressure plate are positioned so as to permit a user to type with all digits when said glove-like apparel is worn on the user's hand and said tracking device and said first pressure plate are in an operable position.

9. The computer input device of claim 1, wherein said tracking device is a micro roller-ball.

10. The computer input device of claim 1, wherein said tracking device includes a base plate, which provides for smooth and consistent motion of said tracking device over said surface, and maintains a consistent distance and an even contact between said tracking device and said surface.

11. The computer input device of claim 1, wherein said transmitter is a radio frequency transmitter.

12. The computer input device of claim 1, wherein said transmitter is an infrared transmitter.

13. The computer input device of claim 1, wherein said transmitter includes a rechargeable power supply for supplying power to said transmitter.

14. The computer input device of claim 1, wherein said glove-like apparel is adjustable to the size of the user's hand.

15. The computer input device of claim 1, wherein said glove-like apparel includes a padded palm to minimize user strain and to maximize user performance and comfort.

16. The computer input device of claim 1, wherein said glove-like apparel has an exterior surface, and wherein portions of said exterior surface of said glove-like apparel are comprised of a low-friction material permitting said glove-like apparel to slide easily over said surface.

17. The computer input device of claim 1, wherein said glove-like apparel has an interior surface, and wherein portions of said interior surface of said glove-like apparel are comprised of a high-friction material for generating friction between said glove-like apparel and a user's hand for permitting accurate positioning of said tracking device and said pressure plate and to prevent said tracking device and said pressure plate from shifting during use.

18. A computer input device, comprising:
   a glove-like apparel having fittings for at least two digits to be worn on a user's hand;
   a tracking device attached to a first one of said digit fittings to generate movement signals in accordance with movement of said tracking device along a surface;
   a first pressure plate switch attached to a second one of said digit fittings to provide first switching signals;

a transmitter attached to said glove-like apparel to transmit said movement signals from said tracking device and said first switching signals; and an on/off switch for automatically disengaging said tracking device and said first pressure plate whenever said tracking device is not in contact with said surface and for automatically engaging said tracking device and said first pressure plate whenever said tracking device is in contact with said surface, wherein said tracking device and said first pressure plate are operably positioned sufficiently back from the tips of said digits so as to permit a user to type with all digits when said glove-like apparel is worn on the user's hand, and wherein said transmitted movement signals from said tracking device are adapted to control movement of a cursor in a video display of a computer, and said first switching signals are used to control clicking functions.

19. A computer input device, comprising:

a glove-like apparel having fittings for at least three digits to be worn on a user's hand;

an optical tracking device enclosed in a base plate attached to a first one of said digit fittings, said tracking device generating movement signals in accordance with movement of said tracking device along a surface;

a first pressure switch plate attached to a second one of said digit fittings to provide first switching signals;

a second pressure switch plate attached to a third one of said digit fittings to provide second switching signals;

an on/off switch means to automatically disengage said tracking device and said pressure switch plates whenever said tracking device is not in contact with said surface and to automatically engage said tracking device and said pressure switch plates when ever said tracking device is in contact with said surface; and a transmitter means to transmit said movement signals from said tracking device and said switching signals from said first and second pressure plates, wherein said tracking device and said pressure plates are positioned on said glove-like apparel so as to permit said user to type with all digits on a keyboard when said glove-like apparel is worn on said user's hand, and wherein said movement signals from said tracking device are adapted to control the movement of a cursor in a video display of an associated computer, and said first and second switching signals are used to control clicking functions.

20. The computer input device of claim 19, wherein said tracking device and said first and second pressure plates are operably positioned so as to leave the tips of said digits exposed for typing.

21. A computer input device, comprising:

a glove-like apparel;

a tracking device attached to said glove-like apparel to generate movement signals in accordance with movement of said tracking device across a surface;

a first pressure plate attached to said glove-like apparel to provide first switching signals;

a transmitter means attached to said glove-like apparel for transmitting said movement signals from said tracking device and said first switching signals, and an on/off switch for automatically disengaging said tracking device and said first pressure plate whenever said tracking device is not in contact with said surface and for automatically engaging said tracking device and said first pressure plate whenever said tracking device is in contact with said surface, wherein said transmitted movement signals from said tracking device being adapted to control movement of a cursor in a video display of a computer and said transmitted first switching signals being adapted to initiate clicking functions.

22. The computer input device of claim 21, wherein said glove-like apparel has fittings for at least two digits and wherein said tracking device is attached to a first one of said digit fittings and said first pressure plate is attached to a second one of said digit fittings.

23. The computer input device of claim 22, wherein said tracking device and said first pressure plate are positioned so as to leave the tips of said digits exposed for typing.

24. The computer input device of claim 23, wherein said glove-like apparel includes a third digit fitting having a second pressure plate attached thereto to provide second switching signals, and wherein said transmitter means also transmits said second switching signals from said second pressure plate to said computer for controlling mouse clicking functions, and wherein said second pressure plate is positioned so as to leave the tips of said digits exposed for typing.

25. The computer input device of claim 21, wherein said tracking device and said first pressure plate are positioned so as to permit a user to type with all digits when said glove-like apparel is worn on the user's hand and said tracking device and said first pressure plate are in an operable position.

26. A computer input device, comprising:

a glove-like apparel having a fitting for at least one digit;

a tracking device attached to said glove-like apparel to generate movement signals in accordance with movement of said tracking device across a surface;

a first pressure plate attached to said at least one digit fitting in a downward facing position, said first pressure plate designed to generate first switching signals when pressed against said surface;

a transmitter attached to said glove-like apparel for transmitting said movement signals and said first switching signals; and an on/off switch for automatically disengaging said tracking device and said first pressure plate whenever said tracking device is not in contact with said surface and for automatically engaging said tracking device and said first pressure plate whenever said tracking device is in contact with said surface, wherein said tracking device and said first pressure plate are positioned so as to permit a user to type with all digits when said glove-like apparel is worn on the user's hand and said tracking device and said first pressure plate are in an operable position, and wherein said movement signals are for controlling movement of a cursor in a video display of a computer and said first switching signals are for controlling mouse clicking functions.

27. The computer input device of claim 26, wherein said glove-like apparel includes a second digit fitting having a second pressure plate attached thereto to provide second switching signals for controlling mouse clicking functions, and wherein said transmitter is for transmitting said second switching signals.

28. The computer input device of claim 27, wherein said glove-like apparel has a third digit fitting and wherein said tracking device is attached to said third digit fitting.

29. The computer input device of claim 26, wherein said glove-like apparel comprises a stretchable material.

30. The computer input device of claim 26, including straps for anchoring said glove-like apparel around the user's wrist area.

31. A computer input device, comprising:
a glove-like apparel to be worn on a user's hand, said glove-like apparel having a fitting for at least one digit;
a tracking device attached to said at least one digit fitting in a downward facing position to generate movement signals in accordance with movement of said tracking device across a surface, said surface being substantially parallel the palm of the user's hand;
a first pressure plate attached to said glove-like apparel to provide first switching signals;
a transmitter attached to said glove-like apparel for transmitting said movement signals and said first switching signals; and
an on/off switch for automatically disengaging said tracking device and said first pressure plate whenever said tracking device is not in contact with said surface and for automatically engaging said tracking device and said first pressure plate whenever said tracking device is in contact with surface,
wherein said tracking device and said first pressure plate are positioned so as to permit the user to type with all digits when said glove-like apparel is worn on the user's hand and said tracking device and said first pressure plate are in an operable position, and
wherein said movement signals are for controlling movement of a cursor in a video display of a computer and said first switching signals are for controlling mouse clicking functions.

32. The computer input device of claim 31, wherein said glove-like apparel has a second digit fitting and wherein said first pressure plate is attached to said second digit fitting.

33. The computer input device of claim 32, wherein said glove-like apparel includes a third digit fitting having a second pressure plate attached thereto to provide second switching signals for controlling mouse clicking functions, and wherein said transmitter is for transmitting said second switching signals.

34. The computer input device of claim 31, wherein said glove-like apparel comprises a stretchable material.

35. The computer input device of claim 31, including straps for anchoring said glove-like apparel around the user's wrist area.

36. A computer input device, comprising:
a glove-like apparel to be worn on a user's hand, said glove-like apparel having a fitting for at least one digit;
a tracking device attached to said glove-like apparel to generate movement signals in accordance with movement of said tracking device across a surface, said surface being substantially parallel to the palm of the user's hand;
a first pressure plate attached to said at least one digit fitting in a downward facing position, said first pressure plate designed to generate first switching signals when said first pressure plate is pressed against said surface;
a transmitter attached to said glove-like apparel for transmitting said movement signals and said first switching signals; and
an on/off switch for automatically disengaging said tracking device and said first pressure plate whenever said tracing device is not in contact with said surface and for automatically engaging said tracking device and said first pressure plate whenever said tracking device is in contact with said surface,
wherein said tracking device and said first pressure plate are positioned so as to permit the user to type with all digits when said glove-like apparel is worn on the user's hand and said tracking device and said first pressure plate are in an operable position, and
wherein said movement signals are for controlling movement of a cursor in a video display of a computer and said first switching signals are for controlling mouse clicking functions.

37. The computer input device of claim 36, wherein said glove-like apparel includes a second digit fitting having a second pressure plate attached thereto to provide second switching signals for controlling mouse clicking functions, and wherein said transmitter is for transmitting said second switching signals.

38. The computer input device of claim 37, wherein said glove-like apparel has a third digit fitting and wherein said tracking device is attached to said third digit fitting.

39. The computer input device of claim 36, wherein said glove-like apparel comprises a stretchable material.

40. The computer input device of claim 36, including straps for anchoring said glove-like apparel around the user's wrist area.

* * * * *